Sept. 23, 1947. J. W. CHAMBERLAIN Re. 22,917

MEANS FOR AND METHOD OF COOLING BY SPRAYING A COOLED LIQUID

Original Filed Feb. 13, 1943 2 Sheets-Sheet 1

Inventor
Joseph W. Chamberlain

By Spencer, Marzall, Johnston & Cook Attys

Sept. 23, 1947. J. W. CHAMBERLAIN Re. 22,917

MEANS FOR AND METHOD OF COOLING BY SPRAYING A COOLED LIQUID

Original Filed Feb. 13, 1943 2 Sheets-Sheet 2

Inventor
Joseph W. Chamberlain
By Spencer, Margall, Johnston & Cook, Attys.

Reissued Sept. 23, 1947

Re. 22,917

UNITED STATES PATENT OFFICE 22,917

MEANS FOR AND METHOD OF COOLING BY SPRAYING A COOLED LIQUID

Joseph W. Chamberlain, Holland, Mich.

Original No. 2,380,901, dated July 31, 1945, Serial No. 475,715, February 13, 1943. Application for reissue June 27, 1946, Serial No. 682,167

16 Claims. (Cl. 62—141)

This invention relates in general to refrigerators and particularly to that type of refrigerator which is designed for cooling fluids or other substances. More especially, my invention relates to the cooling of milk and the preferred embodiment of the invention as disclosed herein is designed to cool fluids, such as milk, in a relatively short period of time.

One of the objects of this invention is to provide a structure wherein a fluid such as milk can be economically cooled at a rapid rate.

Another object of the invention is to provide a cabinet within which the substance to be cooled can be placed in a receptacle and have a heat exchange fluid, such as water, sprayed on the sides and bottom thereof to thereby effect a speedy cooling of the fluid.

A further object of the invention is to provide, in a refrigerator, a compartment wherein ice is formed, around and through which the used heat exchange or cooling fluid may be passed for further cooling and re-use.

Still another object of the invention is to provide within the refrigerator additional means for maintaining the air in the cabinet at a low temperature so that fluid, such as milk, stored therein will not become warm.

A further object of the invention is to provide, in a refrigerator, a means to automatically control the refrigerating unit in such a manner that it will start within a short or predetermined time after the cooling process has been started and will stop when the desired amount of ice has been reformed, thus eliminating the usual gradual building up of the ice reserve beyond the desired amount.

A further object of the invention is to provide, in a refrigerator having a quantity of ice therein, a means to cause the ice to melt uniformly so that it will be replaced uniformly.

A still further object of the invention is the provision of a refrigerating unit which can be not only cheaply constructed but also economical to operate.

A still further object of the invention is to provide a method by which a substance can be economically and quickly brought from a high to a low temperature.

Other objects and advantages of the invention will become apparent upon a reading of the following description taken in connection with the accompanying drawings wherein.

Figure 1:
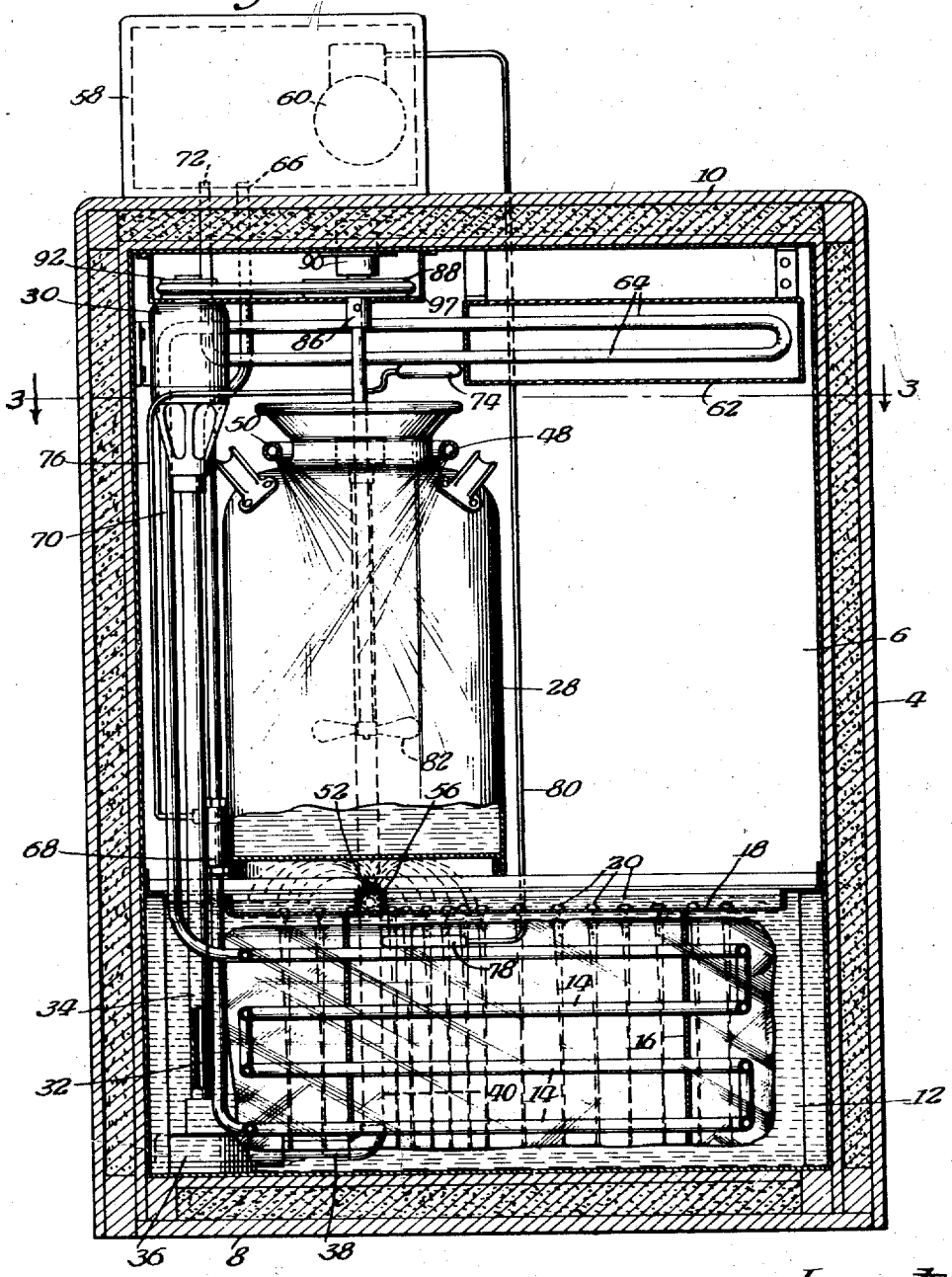
Fig. 1 is a vertical section through the refrigerator showing certain parts therein in front elevation.
Figure 2:
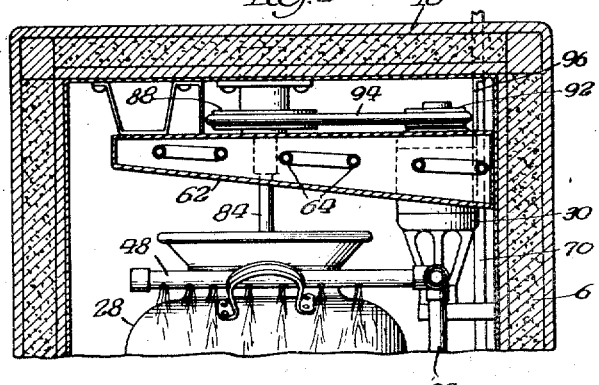
Fig. 2 is a vertical section taken from front to rear through substantially the center of the refrigerator.

The invention disclosed herein is designed as a more economical structure and as an improvement over the device disclosed by me in Patent No. 2,256,971, issued September 23, 1941.

In the preferred embodiment of my improved structure I provide a cabinet, in the lower portion of which is a compartment which may either be integral with or separate from the main refrigerator box. In this lower compartment I provide a plurality of refrigerating coils or an evaporator adapted to form a substantially solid block of ice therein. Immediately above this block of ice I provide a pan having a plurality of perforations therein. The excess water in the lower compartment is pumped therefrom and sprayed over the receptacle within which the milk or other substance to be cooled is located. A portion of the cold water thus pumped is by-passed and is sprayed upwardly against the bottom of the receptacle. This water mixes with the water being sprayed over the receptacle and passes downwardly through the perforations in the pan and flows in streams onto the ice in the lower compartment. At first the water will form a thin layer over the top of the block of ice, however as the process is carried on the water flowing through the perforations in the pan will form holes through the block of ice. Eventually these holes will extend entirely through the ice so that the water will not only pass over and around the ice but downwardly therethrough. Some of this water will also directly contact the refrigerating coils and thus the temperatrue of the water or other heat exchange liquid will be quickly lowered. By utilizing this method I have been able to effectively cool a conventional can of milk from a temperature in the neighborhood of 95° F. down to around 45 or 50° F. in a period of about ten minutes.

Referring now more particularly to the drawings, it will be noted that in this preferred embodiment I provide a refrigerator cabinet having spaced apart sides 2 and 4, a back 6, a bottom 8 and a top 10. In the front of the box I may provide doors or other suitable closure members. However, it is necessary that the entire cabinet together with the front closure members, be effectively insulated to prevent any warm air from entering and thus decreasing the efficiency of the cooling system.

Figure 4:
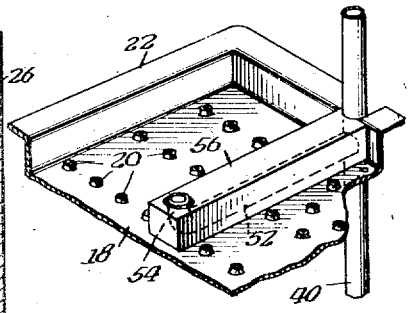
Fig. 4 is a fragmentary perspective view of the pan disposed immediately above the coils; and, Fig. 5 is a fragmentary enlarged section through the pan showing the preferred construction of the openings therein.
Figure 4:
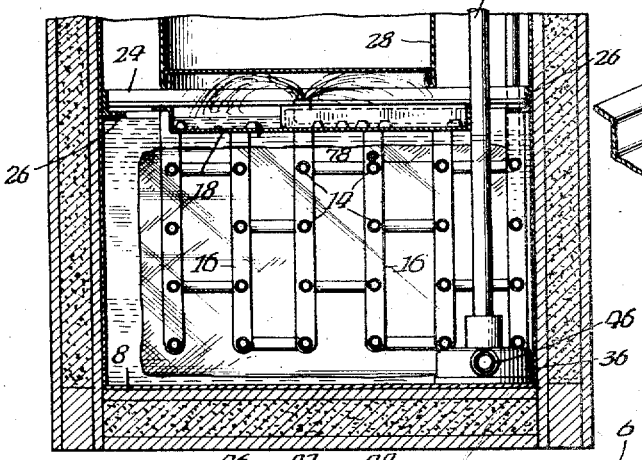
Figure 5:
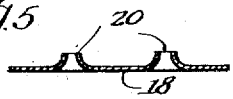
Figure 3:
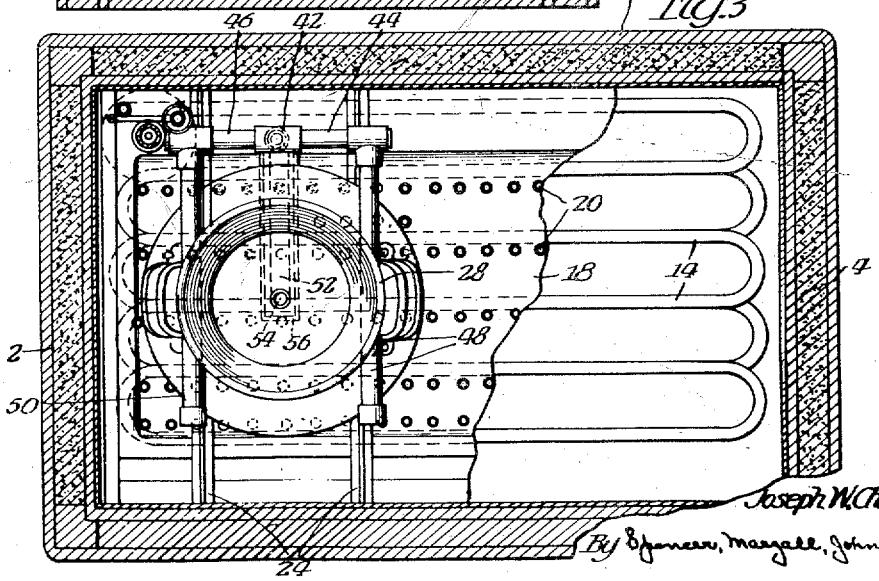
Fig. 3 is a horizontal section through the refrigerator taken substantially on the plane of line 3—3 of Fig. 1 with a part of the pan broken away to show the coils in plan.

In the bottom portion of the cabinet, or in any other desired location adjacent thereto, I provide a compartment 12 within which a plurality of refrigerating coils 14 are located. If desired these coils may be supported by brackets 16 which may either rest on the bottom or be suspended from suitable means within the cabinet. Immediately above these coils there is provided a pan 18 having a plurality of perforations 20 therein. The upper edges of the sides and ends of this pan are outwardly flanged as at 22, see Fig. 4, so that the pan can be welded or otherwise permanently secured to a plurality of spaced apart transversely extending bars 24. These bars may be either flat or of a T formation as shown.

At opposite sides of the refrigerator box and therewithin there are provided angle bars 26 so as to support the pan 18 by having the cross bars 24 thereof rest on the horizontally extending leg members of said angle bars.

Assuming that milk is to be the fluid cooled it is usually placed in a receptacle such as that shown at 28. This receptacle is then placed within the refrigerator at one side thereof and rests upon the bars 24. It is to be understood of course that the refrigerators may be made any desirable size. However, it is customary to provide means for cooling one or more cans of milk while providing space for storing the cans of milk already cooled. Obviously the number of cans of milk to be cooled and stored will vary, depending upon the size of the farm or dairy using the refrigerator. In the present instance, however, I have shown a refrigerator having sufficient space therein to cool one can of milk and additional space for storing a can of milk already cooled.

At one side of the refrigerator and at the upper portion thereof I provide a motor 30 which has a downwardly extending shaft 32 located within a tubular housing 34. This shaft extends to the lower part of the refrigerating compartment and is connected to a pump 36. A conduit 38 is connected to the pump and is adapted to carry water or other cooling fluid from the lower refrigerating compartment upwardly through the conduit 40 to a location above the receptacle. The upper end of the conduit 40 is provided with a T connection 42 which has extending outwardly at each end thereof short conduits 44 and 46 which, in turn, have connected thereto the forwardly extending conduits 48 and 50. These conduits or pipes 48 and 50 extend forwardly one at each side of the upper portion of the receptacle 28 and have a plurality of spaced apart openings in the underside thereof which direct the water in the form of small streams inwardly toward the receptacle, so that when the pump is in operation the cold water will be carried from the lower compartment upwardly and sprayed over the receptacle as indicated in Fig. 1. It is to be understood of course that these spray conduits may take other specific forms such as shown for example in my previously issued patent above referred to and in my co-pending application Serial No. 405,277, filed August 4, 1941.

As stated before, a portion of the water thus pumped upwardly from the lower compartment is by-passed to spray upwardly against the under side of the receptacle and for this purpose there is provided a forwardly extending conduit 52 (see Fig. 4) which has an upturned forward end 54. In the preferred form of the invention shown herein the conduit 52 extends forwardly at approximately the same level as the pan 18 or slightly thereabove and for this reason I provide a cut-out portion in the pan and surround the conduit 52 by means of a housing 56. If desired, however, it would not effect the operation of the device to have the conduit 52 pass beneath the pan and spray the water upwardly through a suitable opening therein. In the present instance, however, the conduit is permitted to terminate closely adjacent the underside of the receptacle and thus have a greater cooling effect thereon.

There is, however, a second and equally, if not more, important reason for thus by-passing a portion of the cooled water. The warmer water flowing over the receptacle mixes uniformly with the cooler by-passed water, and this mixture having a uniform temperature, is then distributed evenly over the ice through the openings in the tray 18, thus causing a uniform melting of the ice. Such a uniform melting is necessary to insure an equally uniform replacement of the ice during and after the cooling cycle.

I have found it most convenient to locate the usual refrigerator mechanism 58 at the top of the refrigerator. However, the particular location of this mechanism is not important. The details of such a refrigerating device or compressor are well known to those skilled in the art and need not be described in detail here. However, suffice it to say it is provided with the usual motor as indicated at 60.

While it is not necessary to the successful operation of my refrigerating mechanism, I have found it highly desirable, especially in warmer weather, to provide refrigerating means or a hold-over device for reserve cooling within the upper part of the cabinet. In the preferred embodiment of my invention I have shown this portion of the refrigerating mechanism as being located adjacent the top of the cabinet as at 62. The housing 62 is provided therein with a plurality of refrigerating coils 64 and a quantity of liquid such as water, and as the refrigerant passes therethrough a quantity of ice is formed within the housing so that the temperature within the cabinet will be maintained comparatively low. For example, in actual practice I prefer to arrange this mechanism so as to maintain a substantially 40° F. temperature within the cabinet, thus maintaining the milk or other cooled fluid at a low temperature even though it is being stored therein. It may be desirable in certain instances to provide, instead of a single reserve cooling device in the top of the cabinet, one or two of such devices located on the inner walls thereof. However, I have found that the placement of this device adjacent the top of the cabinet obtains more satisfactory results. This device creates a natural circulation of air within the cabinet, since the warm air tends to rise and the cooler air at the top tends to drop, thus replacing the warm air and maintaining the cabinet at a substantially even low temperature for all practical purposes.

The refrigerating mechanism 58 is provided with the usual outlet 66 for the refrigerant which then passes through the expansion valve 68 and into the coils 14. The water within the compartment will then eventually become frozen and form a solid block of ice. The refrigerant then passes out of the compartment and upwardly through the pipe 70 to the housing 62 of the reserve cooling device. Passing of the refrigerant through these coils will eventually freeze the water in the housing and form ice therein. The refrigerant then leaves the coils 64 and passes upwardly to the inlet 72, into the refrigerating mechanism or compressor at the top of the cabinet.

In controlling the temperature and the flow of the refrigerant I provide two thermal bulbs; one indicated at 74, which is connected directly to the expansion valve by the connection 76 and controls the flow of the refrigerant therethrough, and the other indicated at 78 within the refrigerating compartment, which is connected directly to the control mechanism which controls the motor 60 through the connection 80 and starts or stops the motor, depending upon the temperature at which the bulb 78 is set to operate.

It is to be noted that the location of the bulb 78 is quite important in that it should be in a position so that the warmer used water can be directed against it when the cooling process is started. The reason for this will appear more fully hereinafter. In the present instance it is shown secured to one of the top coils 14 and immediately below the pan 18.

In order to avoid operating the compressor or refrigerating mechanism a great number of times daily and, which is even more important, to prevent a gradual accumulation of ice beyond the desired amount, I have found it desirable to start the flow of refrigerant within a short period of time after a cooling process has started, so that the ice which has been melted by the warmer water passing thereover will be replaced. To explain more fully, in the conventional type of cooler employing an ice reserve it is customary to provide a large tank having a number of refrigerating coils therein. The receptacles are immersed in the water of the tank and the bulb of the temperature control is embedded in the ice. In that type of refrigerator no provision is made for melting the ice around the bulb faster than elsewhere, therefore the control must be set to cut in the compressor at a temperature of 32° F. or less. Consequently the refrigerant in the coils is maintained at 32° F. or less and some ice will continue to form after the cooling operation has ceased. The device, then, cycles quite often even during periods when nothing is being cooled, and the amount of ice which is formed each time is greater than the amount melted during the short off cycle. As a result, there is a gradual building up of excess ice around the coils. In some machines manual controls are provided to avoid this, but that is obviously undesirable.

While this excess ice acts as an insulator and thus reduces the efficiency of the machine, it can be operated by providing a sufficiently large body of water. On the other hand it would not be practical for a compact machine of the character herein described, because the limited amount of water available would eventually become frozen and none would remain for carrying out the cooling operation.

I, therefore, prevent such accumulation of unwanted ice by setting the control bulb to cut in at a temperature above 32° F. and causing the ice around the bulb to melt rapidly as soon as the cooling cycle has started. The amount of ice being replaced is then controlled by setting the control to cut out at a lower temperature. The unit cannot, therefore, operate on short cycles, and the amount of ice which melts during the long off cycle more than compensates for the amount formed after the compressor stops.

To do this in the specific embodiment of the invention shown herein I provide a greater number of perforations in the pan 18 immediately over the bulb 78, so that as soon as the cooling process starts and the first of the warmer water is received in the pan 18 more water will pass downwardly through the pan in the vicinity of the bulb 78 than at any other place. This immediately melts the ice around the bulb and within a very few minutes will raise the temperature of the bulb so that it will start the refrigerating mechanism and the flow of refrigerant. It will be obvious then that the refrigerant will continue to flow until the desired amount of ice has been re-formed and the refrigerator will be in readiness for cooling the next group of milk receptacles.

In actual practice I have found the most satisfactory results to be obtained when the thermal bulb 78 is set to start the motor 60 at a temperature above 32° F. and preferably in the neighborhood of 34° F. and to stop the refrigerating action when the temperature has dropped to about 27° F., although it may be varied within desirable limits. When the bulb is thus set and the refrigerating operation is begun, sufficient ice will have been melted from around the bulb 78 and its temperature will attain 34° F. to start the motor 60 in about 2½ minutes. The ice however will not be re-formed quite as fast as it is melted, so that when the cooling operation has ceased the refrigerant will continue to flow for a period of time until the desired amount of ice has been re-formed and the bulb 78 reaches 27° F., at which time the motor 60 will be stopped and the flow of refrigerant will cease.

By the use of this structure and method I have found that the refrigerator will go through this cycle only twice a day, and then only at those times when a cooling operation is being performed and for a period of time thereafter. In refrigerators of this general character heretofore known where use is made of the formation of ice around coils, it is quite usual for such refrigerators to cycle as many as six or eight times daily and in some instances every 1½ hours or so. The advantages in cycling the machine but twice a day instead of several times will be obvious.

Another novel feature of my invention is making use of the pump motor 30 to also drive the agitator within the receptacle during the cooling operation. As is customary, the agitator has the usual blades 82 which are secured to one end of a shaft 84. This shaft extends upwardly and is detachably secured at its upper end to a coupling 86 which in turn is rotated by its connection with a suitable vertical shaft. On the permanently mounted vertical shaft I provide a pulley 88. Above the pulley the shaft is suitably mounted in a housing 90 within which the necessary bearings are located which may be sealed within the housing and self-lubricated. The upper end of the shaft 32 of the motor 30 is provided with a pulley 92 which in turn is connected with the pulley 88 by means of a belt 94. It will thus be evident that as long as the cooling operation is in process and the motor 30 is in operation, the agitator consisting of the shaft 84 and the blades 82 will also be operated. At the end of the cooling operation the shaft 84 may be removed from its coupling 86 so that the milk receptacle can be removed and either be placed in storage in the other side of the cabinet or otherwise disposed of. In order to prevent any dirt or grease from this mechanism from dropping downwardly into the milk or other substance being cooled, I place a housing 96 around the two pulleys and seal the oil in the bearings. The particular form of this housing is not important as long as it provides a sealed enclosure to prevent leakage of oil or grease out of the bearings, especially if the substance being cooled is milk. Means may also be provided for mounting the stirrer mechanism flexibly, such as in rubber or on springs to prevent excessive vibrations of the stirrer if the rod should be bent and out of balance.

The operation of my device is novel in many respects. For example, it makes use of the fact that a small stream of water falling on a block of ice will eventually form a hole through the ice from top to bottom. Formation of excessive amounts of ice is prevented by automatic control, and uniform melting of the ice is secured by mixing the warmer water flowing over the receptacle with the by-passed water and distributing it uniformly over the ice bank. Assuming that the refrigerating device has operated for a sufficient length of time to form a solid block of ice in the lower compartment and the milk receptacle is suitably located between the spray arms 48 and 50, the motor 30 is then turned on. The excess water in the lower compartment is then pumped upwardly through the conduits 40. A greater proportion of this water will then be by-passed through the conduit 52 and will be sprayed upwardly against the bottom of the receptacle 28. The remainder of the water will pass upwardly and will be sprayed over the receptacle through the openings in the conduits 48 and 50. The water thus sprayed over the receptacle will pass downwardly and become warmer. The water sprayed upwardly against the bottom of the receptacle will be several degrees colder because it has not contacted as great an area of the receptacle. The sprayed water and the by-passed water will then mix and be received by the pan 18. At first a sufficient amount of the water will pass through the openings in the pan immediately above the bulb 78 to melt the ice and raise the temperature of the bulb so as to start the motor 60. In a very short time the water in the pan will be above the raised perforations 20 and the water therein will pass substantially uniformly downwardly and fall in small streams onto the block of ice. At first the water will pass over the ice and down the sides thereof to be pumped and sprayed over the receptacle. The falling water, however, will eventually form holes in the ice substantially as shown by the dotted lines in Fig. 1 and this will continue until these holes extend through to the bottom of the block of ice. By this time a portion of the coils will also be bared and some of the water will flow directly in contact therewith. It will thus be evident that the warmer water is able to pass over an unusually great area of ice so that this water will be rapidly cooled down to a temperature in the neighborhood of 33° or 34° F.

It will be clear from the foregoing that, by this method of control a cycle of operation will start shortly after each cooling operation has begun, or after the machine has stood idle long enough to cause the bulb temperature to rise to approximately 34° F. Furthermore, the mixing of the warmer used water with the by-passed water will cause a uniform melting of the ice.

I do not wish to be limited as to the type of substances capable of being cooled by the use of my invention. It will be clear that substances other than those mentioned herein can be refrigerated without in any way departing from the spirit of the invention. For example, the device could be used as an air conditioner by cooling air in the manner herein described and then passing the air into a room.

While I have described and claimed the device as utilizing refrigerating coils through which a refrigerant passes, it will be obvious that other means, such as an evaporator, can be used interchangeably therewith.

While it is not necessary to the successful operation of the device to have the perforations 20 in the pan 18 raised, it is better to have them so for sanitary reasons. Any dirt or sand which may be present in the water will thus be collected in the pan and will not be carried up over the raised perforations.

This construction also facilitates the cleaning of the pan and the lower compartment, since after a cooling operation the pan and the cross-bars connected thereto can be easily removed from the cabinet to provide access to the coils.

Having thus described my invention, what I claim as new and desire to secure by Letters Patent of the United States, is:

1. An apparatus of the class described comprising a compartment adapted to store a cooling fluid therein and having means to freeze a block of ice, means for conveying said cooling fluid from said compartment after it has been cooled and passing it in heat exchange relation with a substance to be cooled, and means to distribute said cooling fluid substantially uniformly over said ice in such a way as to melt a plurality of holes in the ice.

2. A refrigerator of the class described comprising a refrigerating compartment adapted to contain a quantity of heat exchange liquid, a plurality of refrigerating coils in said compartment, means for passing a refrigerant through said coils to thereby freeze a part of said liquid, means for passing the remainder of said liquid in heat exchange relation with a substance to be cooled, and means for distributing said liquid after it has passed in heat exchange relation with the substance to be cooled in such a manner as to melt holes at spaced intervals in the frozen part of said liquid.

3. In a refrigerator of the class described, two cooling zones each adapted to contain a quantity of a freezable heat exchange liquid and refrigerating coils therein, means for passing a refrigerant first through the coils in one zone and then through the coils in the other zone to thereby freeze at least a part of the liquid in each zone, and means for circulating the remaining liquid from at least one of the zones in heat exchange relation with a substance to be cooled, the other zone being adapted to maintain the air in the refrigerator at a low temperature.

4. A refrigerator of the class described comprising a refrigerating compartment having coils therein to freeze a substantially solid block of ice in said compartment, a heat exchange liquid in said compartment, means to circulate said liquid in heat exchange relation with a substance to be cooled, means to collect said liquid after performing its cooling operation and distribute it over said ice, a temperature responsive control embedded in said ice, and means to rapidly melt the ice locally in the area of said control immediately after starting the cooling operation to thereby start the flow of refrigerant through said coils and replace the ice melted by distribution of said liquid thereover.

5. A refrigerator of the class described comprising a refrigerating compartment having coils therein to freeze a substantially solid block of ice in said compartment, a heat exchange liquid in said compartment, means to circulate said liquid in heat exchange relation with a substance to be cooled, a pan having a plurality of perforations therein to collect said liquid after it has passed in heat exchange relation with said substance and distribute it over said ice to thereby melt the ice and cool the liquid, a temperature responsive control embedded in the ice, and means to rapidly melt the ice locally in the area of said control to actuate said control and start the flow of refrigerant within a predetermined period of time after starting the cooling operation, thus replacing the ice.

6. A refrigerator of the class described comprising a refrigerating compartment having coils therein to freeze a substantially solid block of ice in said compartment, a heat exchange liquid in said compartment, means to circulate said liquid in heat exchange relation with a substance to be cooled, a pan having a plurality of perforations therein to collect said liquid after it has passed in heat exchange relation with said substance and distribute it over said ice to thereby melt the ice and cool the liquid, and a temperature responsive control embedded in said ice adapted to start and stop the flow of refrigerant through said coils, the perforations in said pan being so arranged as to distribute a greater quantity of the liquid over the area of said control, thereby melting the ice and actuating said control within a predetermined period of time after the cooling operation begins.

7. The method of refrigeration which consists of forming a block of ice, directing a liquid against said ice in a plurality of streams to form holes in said ice and quickly cool said liquid, and then circulating the cooled liquid in heat exchange relation with a substance to be refrigerated.

8. The method of refrigeration which consists of forming a block of ice, forming a plurality of holes in said ice, passing a heat exchange liquid over said ice and into the holes therein to thereby quickly cool said liquid, and then circulating the cooled liquid in heat exchange relation with a substance to be refrigerated.

9. The method of refrigeration which consists of circulating a cooled liquid in heat exchange relation with a substance to be refrigerated, passing the liquid thus circulated over a block of ice in a plurality of individual streams to thereby recool the liquid by melting holes in the ice, and then replacing the ice thus melted, the ice replacing step being started within a predetermined time after the refrigerating step is begun and carried on until a predetermined amount of ice has been replaced.

10. In a cooling apparatus, means for freezing a freezable cooling liquid to a cake, means for directing a plurality of streams of a warmer cooling liquid against said frozen cake to melt a plurality of holes therein thereby cooling said warmer liquid, and means for circulating the liquid so cooled in heat exchange relation with a substance to be refrigerated.

11. In a cooling apparatus, means for freezing a freezable cooling liquid to a cake, means for directing a plurality of streams of a warmer cooling fluid substantially uniformly against said frozen cake to melt a plurality of holes therein thereby cooling said warmer cooling liquid, means for circulating the liquid so cooled in heat exchange relation with a substance to be refrigerated, said freezing means adapted to replace the melted portion of said frozen cake by refreezing a portion of said cooling liquid.

12. In a cooling apparatus, means for freezing a freezable cooling liquid to form a frozen cake, means for directing a plurality of streams of said cooling liquid against said frozen cake to melt a plurality of holes therein thereby further cooling said cooling liquid, said means for directing said streams against said cake comprising a pan disposed above said cake and having holes therein at spaced intervals, means for circulating the liquid so cooled in heat exchange relation with a substance to be refrigerated, and means to pass said cooling liquid to said pan after it has performed the cooling operation.

13. In a cooling apparatus of the class described, a compartment having means therein to freeze a block of ice and adapted to contain cooling liquid adapted to be cooled by said ice, means for conveying said cooling liquid to a receptacle containing a substance to be cooled, means to collect said cooling liquid after it passes from said receptacle and to distribute it over said ice in such a manner as to cause said ice to melt uniformly, and means to replace said ice at a slower rate than it is melted.

14. A refrigerator of the class described comprising a refrigerating compartment adapted to store a coolant therein, means for freezing a portion of said coolant, means to circulate a portion of said coolant in heat exchange relation with a substance to be cooled and back into contact with the frozen portion thereof to thereby recool said coolant and melt some of the frozen portion, a temperature responsive control embedded in said frozen portion and set to begin operation of the freezing means at a temperature above the freezing point of said coolant, and means to elevate the temperature of said control above the freezing point of said coolant within a predetermined time after starting the cooling operation by a concentrated distribution of said coolant adjacent said control to thereby start the freezing operation and replace the frozen portion which has been melted.

15. A refrigerator of the class described comprising a refrigerating compartment adapted to store a coolant therein, means for freezing a portion of said coolant, means to circulate a portion of said coolant in heat exchange relation with a substance to be cooled and back into contact with the frozen portion thereof to thereby recool said coolant and melt some of the frozen portion, a temperature responsive control embedded in said frozen portion and set to begin operation of the freezing means at a temperature above the freezing point of said coolant and to stop operation of said freezing means at a temperature below the freezing point of said coolant, and means to elevate the temperature of said control above the freezing point of said coolant within a predetermined time after starting the cooling operation by a concentrated distribution of said coolant adjacent said control to thereby start the freezing operation and replace the frozen portion which has been melted.

16. The method of refrigeration which consists of circulating a cooled liquid in heat exchange relation with a substance to be refrigerated, passing the liquid thus circulated substantially uniformly over a block of ice having a temperature responsive bulb embedded therein to thereby recool the liquid by melting the ice, and then replacing the ice thus melted, the ice replacing step being started when the temperature of the bulb reaches a temperature above 32° F. and carried on until the temperature of the bulb falls below 32° F.

JOSEPH W. CHAMBERLAIN.

REFERENCES CITED

The following references are of record in the file of this patent:

UNITED STATES PATENTS

| Number | Name | Date |
|---|---|---|
| 2,256,971 | Chamberlain | Sept. 23, 1941 |
| 2,031,274 | McKay | Feb. 18, 1936 |